United States Patent
Uchida et al.

(10) Patent No.: US 7,345,962 B2
(45) Date of Patent: Mar. 18, 2008

(54) DISK DRIVE DEVICE

(75) Inventors: Morihiko Uchida, Tokyo (JP); Tetsuya Suzuki, Tokyo (JP); Yoshikazu Kagawa, Tokyo (JP); Hiroto Handa, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 396 days.

(21) Appl. No.: 10/311,565

(22) PCT Filed: Jun. 15, 2001

(86) PCT No.: PCT/JP01/05135

§ 371 (c)(1),
(2), (4) Date: Jul. 28, 2003

(87) PCT Pub. No.: WO01/97001

PCT Pub. Date: Dec. 20, 2001

(65) Prior Publication Data

US 2004/0017738 A1    Jan. 29, 2004

(30) Foreign Application Priority Data

Jun. 16, 2000   (JP) .............................. 2000-180936

(51) Int. Cl.
*G11B 17/00* (2006.01)
(52) U.S. Cl. .................... 369/30.32; 361/685
(58) Field of Classification Search ............. None
See application file for complete search history.

(56) References Cited

U.S. PATENT DOCUMENTS

| | | | |
|---|---|---|---|
| 5,229,764 A | | 7/1993 | Matchett et al. |
| 5,406,261 A | * | 4/1995 | Glenn ........................ 340/571 |
| 5,475,839 A | * | 12/1995 | Watson et al. ................ 713/2 |
| 5,799,145 A | | 8/1998 | Imai et al. |
| 5,915,019 A | * | 6/1999 | Ginter et al. ................. 705/54 |
| 6,014,746 A | * | 1/2000 | Krehnke et al. .............. 726/22 |
| 6,288,989 B1 | * | 9/2001 | Ro et al. .................. 369/47.13 |
| 6,910,137 B2 | * | 6/2005 | Liebenow et al. ............ 726/34 |

FOREIGN PATENT DOCUMENTS

| | | |
|---|---|---|
| EP | 0752638 | 1/1997 |
| EP | 0945775 | 9/1999 |
| JP | 08180659 | 7/1996 |

* cited by examiner

*Primary Examiner*—William Korzuch
*Assistant Examiner*—Tawfik Goma

(57) ABSTRACT

There are provided: an optical pickup feed mechanism (12) that detects a disk signal; a disk loading mechanism (11) that feeds a disk D by means of a loading roller (11b) that is driven by a loading motor (11a); a mechanism control section (20) that controls drive of the loading motor (11a); and an authentication control section (30) that authenticates the authorized user and outputs a disk ejection instruction to the mechanism control section (20) if the registered password and disk ejection instruction are input. The authentication control section (30) is provided with a time setting section (36) that stores a set time length in memory (32), a timer (37) that measures time, and a time decision section (38) that determines lapse of the set time length in accordance with the time length stored in the memory section (32) and the time measured by the timer (37).

14 Claims, 8 Drawing Sheets

DISK DRIVE DEVICE

TECHNICAL FIELD

The present invention relates to a disk drive device for detecting information recorded on a disk and in particular relates to a disk drive device wherein improvement is effected in the control of the disk ejection mechanism.

BACKGROUND ART

Typically, personal computers are provided with disk drive devices for removable media such as CD-ROMs, DVD-ROMs or MO disks. Such disk drive devices are often, for example as shown in FIG. 10, of the tray type in which a disk is inserted/ejected by placing the disk D on a tray T that can be extended from or retracted into the main unit C of a personal computer.

Ejection of the disk D in a disk drive device of this tray of type is performed by causing the tray T to project from the main unit C by operating a mechanism that drives the tray T by manually operating an eject button E provided on the tray T. It was also possible to eject the disk D by driving the tray T by inputting a disk ejection instruction, using the OS (operating system) of the personal computer.

However, in such a disk drive device as described above, anyone at all could easily remove the disk by performing operation of the eject button or input of a disk ejection instruction. Consequently for example persons other than the authorized user of the personal computer could easily remove the disk, increasing the possibility of the disk being stolen.

In view of the above problem of the prior art, an object of the present invention is to provide a disk drive device wherein removal of the disk by persons other than the authorized user can be positively prevented.

DISCLOSURE OF THE INVENTION

In order to achieve the above object, the present invention, in a disk drive device in which a signal detection section that detects a disk signal and a disk ejection mechanism that ejects a disk are connected to a control device having input means, is characterized in that said control device comprises: mechanism control means that controls drive of said disk ejection mechanism; and authentication control means that, in a condition in which there has been no manual input operation from said input means, if a pre-set time length has elapsed, outputs a disk ejection instruction to said mechanism control means only if a disk ejection instruction and the authentication information are input.

With the present invention as described above, if the authorized user has not performed a manual input operation from the input means for a pre-set period, unless the disk ejection instruction and authentication information are input, a disk ejection instruction is not output to the mechanism control means from the authentication control means, so the disk is not ejected by the mechanism control means. Consequently, it is possible to reliably prevent the disk being carried away by a person other than the authorized user even if for example the authorized user has left this in place for a long time after moving away from the control device.

Also, another embodiment of the device, in a disk drive device comprising a signal detection section that detects a disk signal and a disk ejection mechanism that ejects a disk, comprises: mechanism control means that controls drive of said disk ejection mechanism; and authentication control means that, in a pre-set time band or time band outside this, outputs a disk ejection instruction to said mechanism control means only if a disk ejection instruction and the authentication information are input.

With a device according to the above embodiment, a disk ejection instruction is not output to the mechanism control means from the authentication control means unless the authorized user inputs a disk ejection instruction and the authentication information in the pre-set time band or outside this time band, so disk ejection by the mechanism control means is not performed. Consequently, persons other than the authorized user can be reliably prevented from carrying away the disk in the time band in which this is not being used by the authorized user.

Also, in another embodiment of the device, authentication information input means that inputs authentication information is connected to said authentication control means and said authentication control means comprises: a time measurement section that measures time; a set time storage section that stores a pre-set time length or time band; a time decision section that determines whether or not the pre-set time length has elapsed or whether the time is within the pre-set time band or outside the pre-set time band, in accordance with information from said time measurement section and said set time storage section; authentication information input means that inputs authentication information; an authentication information storage section that stores prescribed authentication information; a decision section that decides whether or not the authentication information that was input from said authentication information input means agrees with the authentication information stored in said authentication information storage section; and a disk ejection instruction section that outputs a disk ejection instruction to said mechanism control means only if said time decision section determines that the pre-set time length has elapsed or that the time is within the pre-set time band or outside the preset time band and a disk ejection instruction is input and the authentication information is determined to be in agreement by said decision section.

With a device according to the above embodiment, ejection of a disk can be managed in accordance with the two means of time and authentication information, so theft prevention can be aimed at times where theft is likely. Convenience is therefore improved in that the authorized user can remove the disk without inputting authentication information at times when it is unnecessary to aim at theft prevention.

Also, in another embodiment of the device, said authentication information is disk-specific information.

With a device according to this embodiment, disk-specific information such as for example the file name recorded within the disk, the holder name, TOC (table of contents) information, playing time or the title is employed as the authentication information, so the authorized user can easily remember the authentication information.

Also, in another embodiment of the device, said authentication information is a password.

With a device according to the above embodiment, theft prevention can be achieved by a password that is easily managed by the authorized user.

Also, in another embodiment of the device, said authentication information input means comprises a plurality of switches operated by a plurality of buttons and said authentication information is information relating to a combination of sequence and number of times of switch changeover in accordance with operation of said plurality of buttons.

With a device according to the above embodiment, input of authentication information can easily be performed by a combination of button operations.

Also, in another embodiment of the device, said authentication information input means comprises a voice identification section and said authentication information is speaker-limiting voice information.

With a device according to the above embodiment, confirmation of the authorized user can performed more accurately since the authorized user is authenticated by voice.

Also, in another embodiment of the device, said authentication information input means comprises a fingerprint identification section and said authentication information is fingerprint information.

With a device according to the above embodiment, the authorized user can be authenticated using a fingerprint, so confirmation of the authorized user can be performed more accurately.

Also, in another embodiment of the device, said authentication information input means comprises a retinal pattern detection section and said authentication information is retinal pattern information.

With a device according to the above embodiment, the authorized user can be authenticated using a retinal pattern, so confirmation of the authorized user can be performed more accurately.

Also, in another embodiment of the device, the authentication information used in the determination by said decision section is at least two of a plurality of types of authentication information or is one or other of at least two types of the plurality of types of authentication information.

With a device according to the above embodiment, the authorized user can be authenticated by a combination of a plurality of types of authentication information, so the disk can be more reliably prevented from being carried away by a person other than the authorized user.

BEST MODE FOR CARRYING OUT THE INVENTION

[1. Construction of an Embodiment]

An embodiment of the present invention is described below with reference to FIGS. 1 to 9. The portions related to information processing of the authentication control section and mechanism control section in this embodiment are typically performed by a CPU (which may be a CPU of the main computer unit, or a CPU dedicated to the disk drive device or a CPU of an external processing device) controlled by software and its peripheral circuitry. The software achieves the beneficial effect of the present invention by physically utilizing the hardware but, since the type and/or construction of the software or hardware and range of processing with the software or the like can be altered in many different ways, in the following description, virtual circuit blocks are employed for implementing the functions of the present invention and the embodiment. The present invention can also be embodied as a recording medium on which software for implementing this by a computer is recorded.

Figure 1:
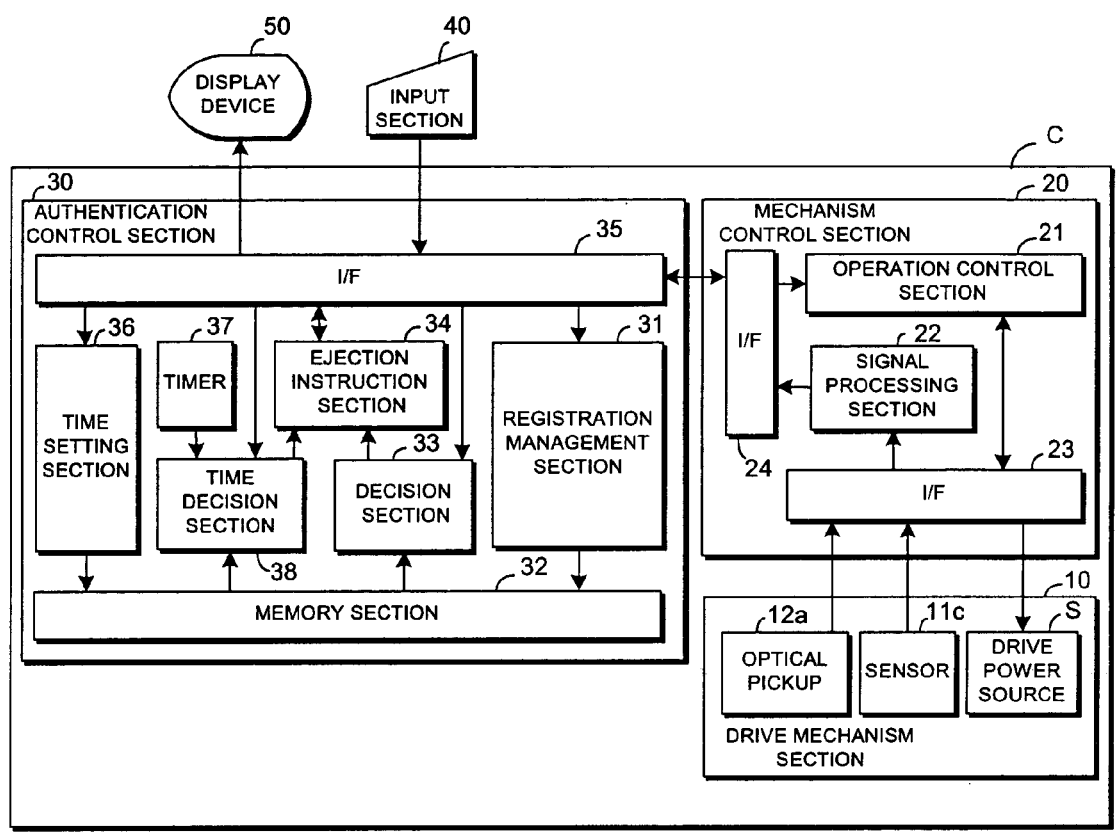
FIG. 1 is a functional block diagram illustrating an embodiment of a disk drive device according to the present invention.
Figure 2:
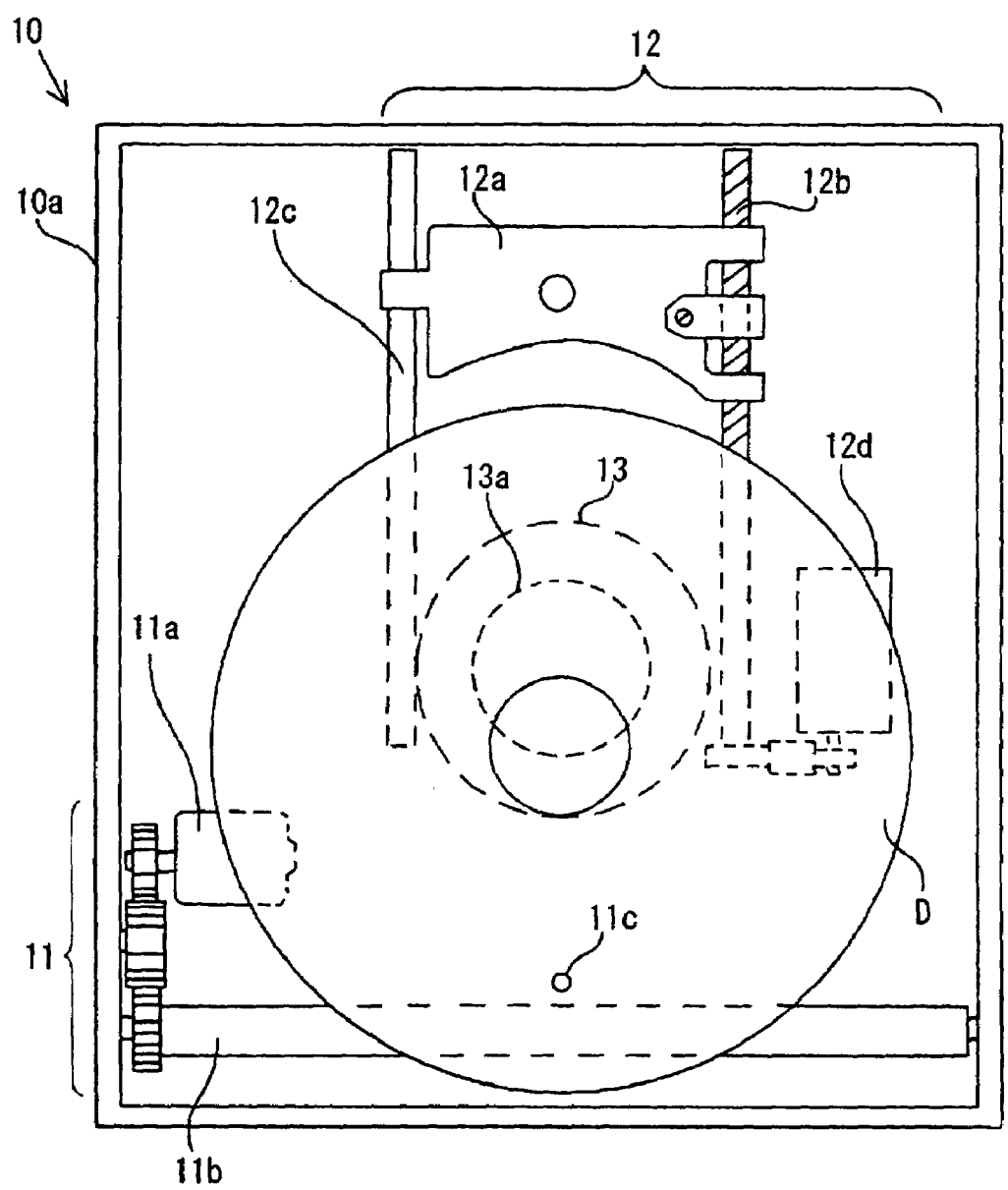
FIG. 2 is a plan view showing a drive mechanism section in the embodiment of FIG. 1.
Figure 3:
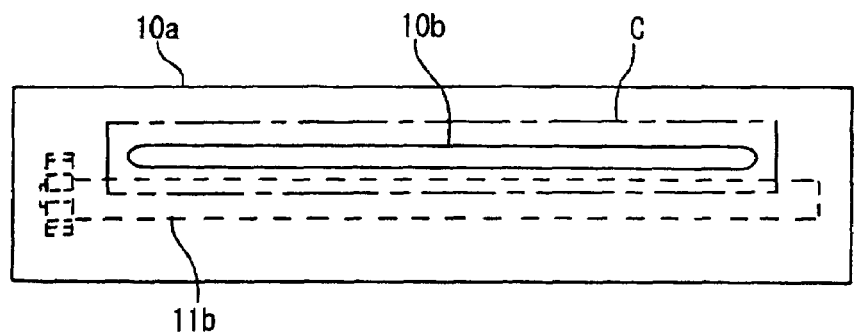
FIG. 3 is a front view showing the drive mechanism section in the embodiment of FIG. 1.
Figure 4:
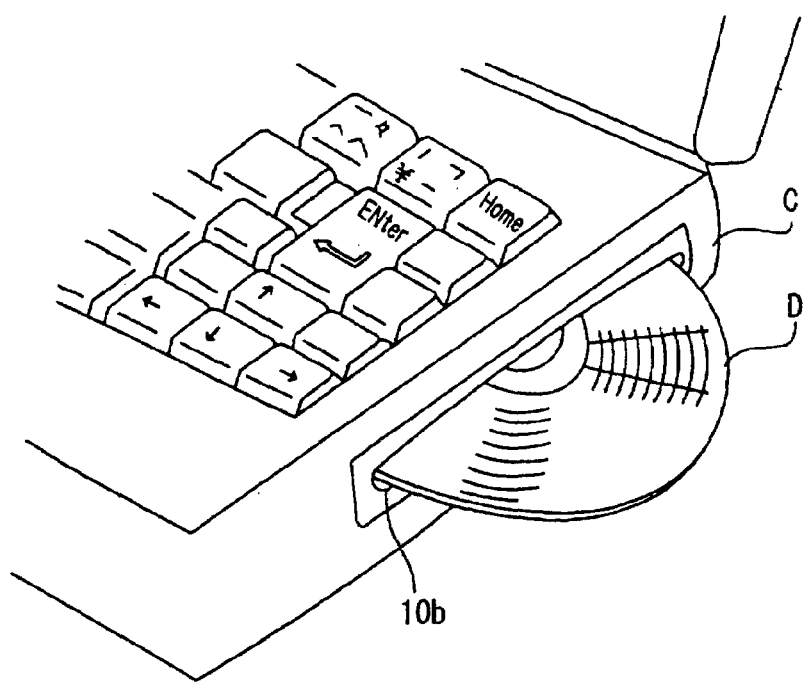
FIG. 4 is a perspective view showing a disk insertion aperture of a main computer unit incorporating the embodiment of FIG. 1.

Specifically, as shown in FIG. 1, this embodiment comprises a drive mechanism section 10 constituted within the main computer unit C, a mechanism control section 20 and authentication control section 30, an input section 40 such as a keyboard or a mouse connected to the computer and a display device 50 such as a CRT or LCD. As shown in FIG. 2, the drive mechanism section 10 comprises a disk loading mechanism 11 arranged in a frame 10*a*, an optical pickup feed mechanism 12, a turntable 13, a clamping mechanism, not shown, and so on. An insertion aperture 10*b* for a disk D is formed in the frame 10*a* as shown in FIG. 3. Also, as shown in FIG. 3 and FIG. 4, the frame 10*a* is accommodated in the main computer unit C in such a way that it cannot be pulled out, only the insertion aperture 10*b* being exposed.

The disk loading mechanism 11 comprises a loading roller 11*b* that is rotated by a loading motor 11*a* with the aid of a gear mechanism and a disk guide (not shown) whereby the disk D is gripped between this and the loading roller 11*b*. The loading roller 11*b* is arranged such that it is capable of being moved in a direction such as to approach or to move away from the disk D by means of a roller approach/retraction mechanism, not shown. A sensor 11*c* that detects insertion/ejection of a disk D is provided in the vicinity of the insertion aperture 10*b* inside the frame 10*a*.

In the optical pickup feed mechanism 12, an optical pickup 12*a* for disk signal detection is slidably arranged between a lead screw 12*b* in the surface of which a screwthread is cut and a guide shaft 12*c* arranged parallel therewith. The lead screw 12*b* is arranged rotatably by means of a feed motor 12*d* by means of a gear mechanism and the optical pickup 12*a* can be slid in the direction of the diameter of the disk D by means of this rotation. The optical pickup 12*a* comprises an actuator for performing tracking and focusing.

The turntable 13 is the member on which the disk D is placed during signal detection and is arranged rotatably by means of a spindle motor 13*a*. The clamping mechanism is a mechanism for gripping the internal diameter of the disk D between a clamper, not shown, and the turntable 13.

The mechanism control section 20 comprises a loading motor 11*a* in the drive mechanism section 10, a feed motor 12*d*, a spindle motor 13*a*, the actuator of the optical pickup, an operation control section 21 that controls the various drive power sources (S of FIG. 1) such as the motor of the roller approach/retraction mechanism, a signal processing section 22 that processes the signal detected by the optical pickup 12a and interfaces (I/F) 23, 24 between the drive mechanism section 10 and the authentication control section 30.

The authentication control section 30 comprises a registration management section 31 that manages authentication information that is registered beforehand, a memory section 32 that stores authentication information, a decision section 33 that compares the authentication information stored in the memory section 32 with input authentication information and decides whether or not these match, an ejection instruction section 34 that outputs a disk ejection instruction to the mechanism control section 20 if a disk ejection instruction is input from the input section 40 and the decision section 33 decides that the authentication information is in agreement, a mechanism control section 20, and an interface (I/F) 35 between the input section 40 and a display device 50.

Further, the authentication control section 30 comprises a time setting section 36 in which a pre-set time length or time band is stored in a memory section 32, a timer 37 that measures the time and a time decision section 38 that decides, on the basis of the time length or time band stored in the memory section 32 and the time measured by the timer 37, whether the set time length has elapsed or is within the set time band or outside the set time band. It should be noted that, in FIG. 1, depiction of the various calculation devices, storage devices and so on to be provided in the main computer unit C is omitted.

[2. Operation of the Embodiment]

[2-1. Disk Insertion]

The operation of the above embodiment will now be described. Specifically, when the authorized user inserts a disk D from the insertion aperture 10b, the disk insertion is detected by the sensor 11c. The loading motor 11a is then operated by an instruction from the operating control section 21 so that rotation of the loading roller 11b in the disk insertion direction is commenced. The disk D is thereby drawn in towards the turntable 13 whilst being gripped between the loading roller 11b and the disk guide. When the internal diameter of the disk D coincides with the turntable 13, the loading roller 11b descends and thereafter the disk D is gripped by the clamping mechanism between the clamper and the turntable 13.

Concurrently with the disk D being set on the turntable 13 in this way, the loading roller 11b is moved in the direction away from the disk D by the roller approach/retraction mechanism, releasing the disk D. Then, while the disk D is rotated on the turntable 13 by the operation of the spindle motor 13a, the optical pickup is moved in the direction of the diameter of the disk D by operation of the feed motor 12d and the actuator, and the signal recorded on the disk is detected. The detected signal is processed by the signal processing section 22 and output to the CPU of the computer.

[2-2. Prevention of Theft Based on Length of Time]

The disk D that has been accommodated in the drive mechanism section 10 as described above is prevented from being removed by a person other than the authorized user, by the sequence illustrated below. This sequence is described with reference to the flow chart of FIGS. 5 to 9. In this embodiment, an input screen display such as a dialogue box is arranged to be provided on the display device 50 for input of the time length, time band and password.

Figure 5:
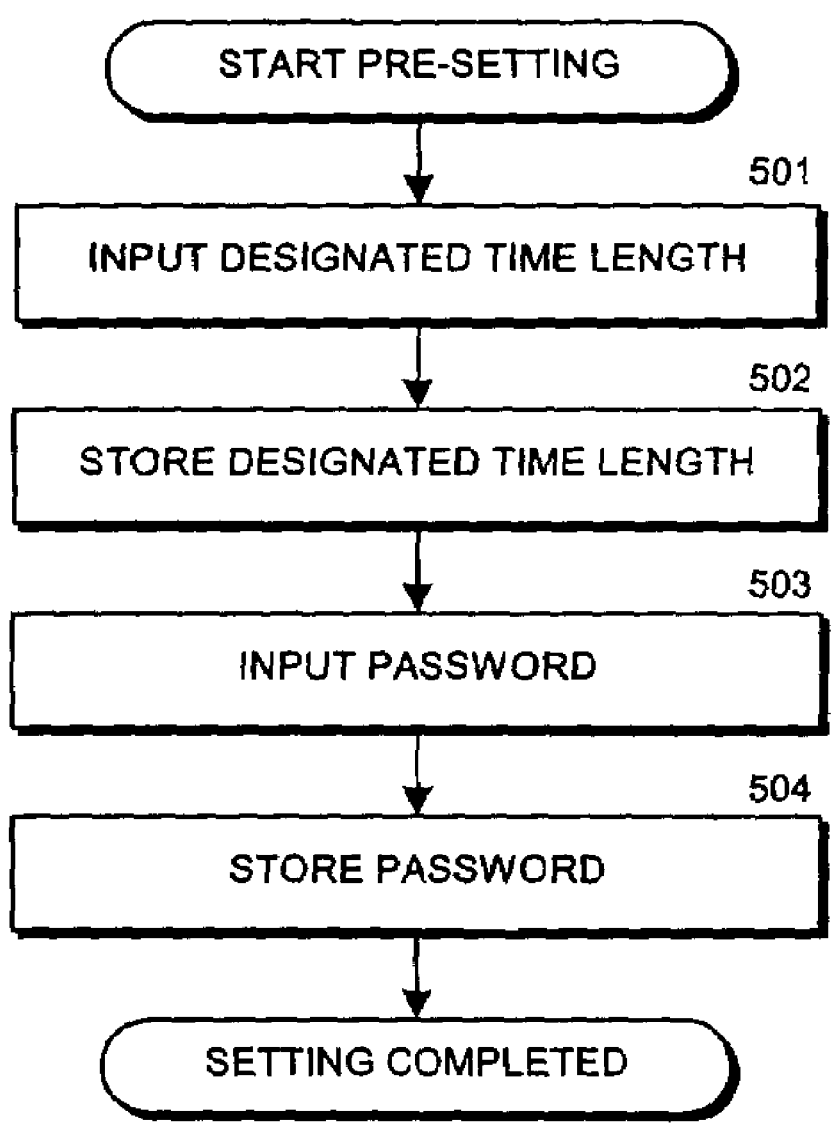
FIG. 5 is a flow chart showing the sequence of time length registration processing in the embodiment of FIG. 1.
Figure 6:
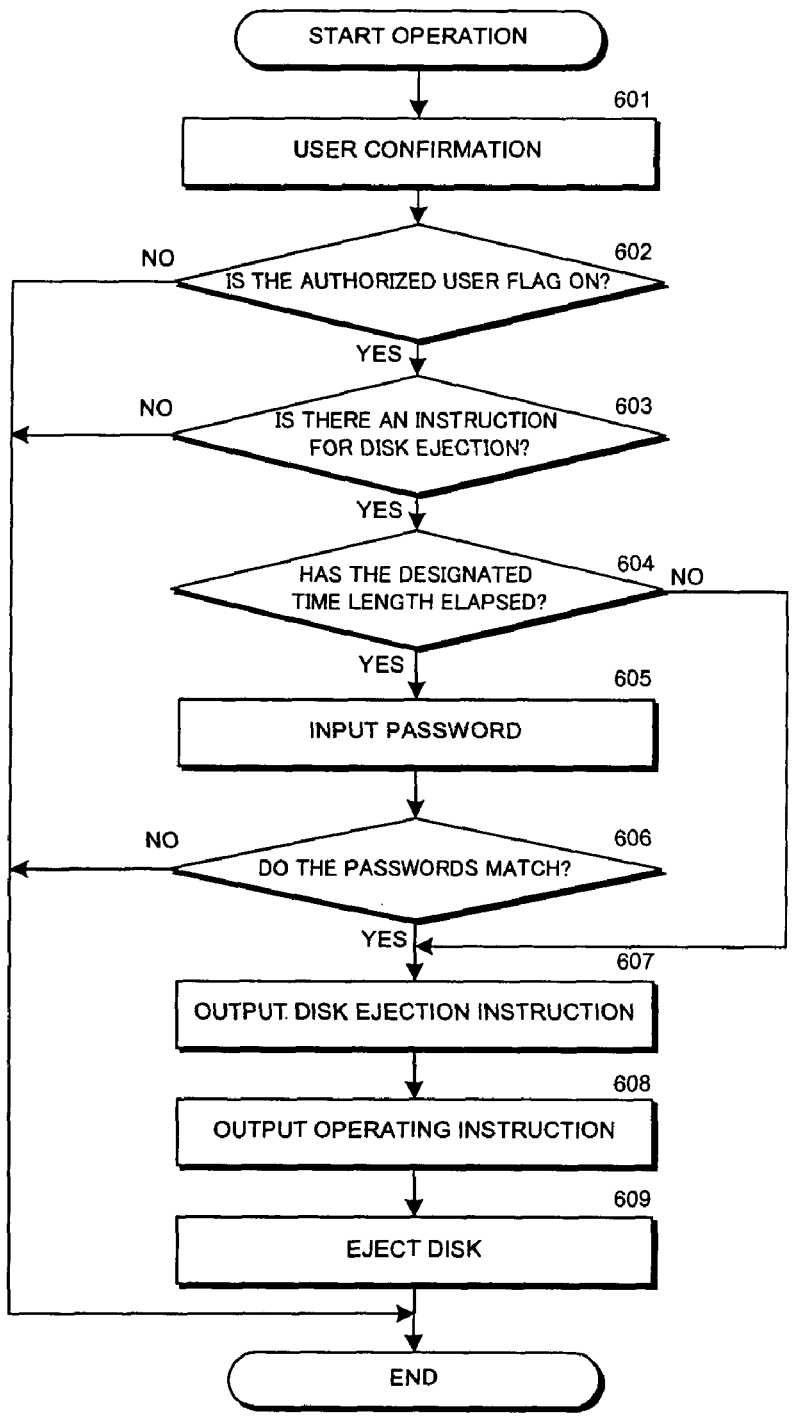
FIG. 6 is a flow chart showing the processing of a time length instruction in the embodiment of FIG. 1 for prevention of disk theft.

First of all, the sequence in the case where disk ejection is restricted if a pre-set time has elapsed without input operation from the input section 40 will be described using the flow chart of FIGS. 5 to 7. Specifically, in response to instructions on the input screen, an authorized user who wishes to set disk theft prevention inputs a designated time length (for example "20 minutes") from the input section 40 (step 501). This designated time length is then stored in the memory section 32 by a time setting section 36 in the authentication control section 30 (step 502). Next, the authorized user inputs a password, which may be selected at will, from the input section 40 in response to instructions on the input screen (step 503). This password is then stored in the memory section 32 as the password of the authorized user by the registration management section 31 in the authentication control section 30 (step 504) and pre-setting processing is thereby terminated.

When setting has been performed as described above and an authorized user wishes to use a computer which is in the power source off condition or from which he has logged off on the network, user confirmation processing is performed when the user starts up the computer or performs a network login. This confirmation processing is performed by inputting the authentication information as shown in the flow chart of FIG. 7 and confirming whether this agrees or not with the authentication information that has been registered beforehand (step 701). Then, if this is confirmed (if it is confirmed that the information is in agreement) (step 702), the authorized user FLAG is set to ON (step 703); if this is not confirmed (if the information is not in agreement), the authorized user FLAG is set to OFF (step 704). Whether the computer user is the authorized user or not is stored. Apart from the FLAG, this storage could be effected by other means such as a memory or register.

Thus, after start-up of the computer or network login, a decision as to whether the person who effected the startup or logged in is the authorized user or not is made using the authorized user FLAG. The sequence of the ejection operation is shown in the flow chart of FIG. 6. First of all, user confirmation processing (step 601) is performed. That is, if user confirmation fails (step 602) because the authorized user FLAG is OFF, processing terminates at this point. Also, if user confirmation succeeds because the authorized user flag is ON (step 602), processing shifts to the subsequent processing. If, after such user confirmation and commencement of use of the computer, the authorized user for example leaves the computer and then returns to the computer again after the lapse of 20 minutes, intending to take out the disk D, the user may input a disk ejection instruction from the input section 40 (step 603). When this happens, the time decision section 38 determines that the designated time (in this case, 20 minutes) has elapsed (step 604) without there being any manual input from the input section 40, by referring to the time measured by the timer 37 and the time stored in the memory section 32.

Next, since a password input screen is displayed on the display device 50, the previously registered password is input from the input section 40 (step 605). When this happens, the decision section 33 compares the password that is input with the password of the authorized user stored in the memory 32 and determines whether these agree or not (step 606). If it is found that they do agree, the ejection instruction section 34 then outputs a disk ejection instruction (step 607) to the operation control section 21 of the mechanism control section 20.

When the disk ejection instruction from the ejection instruction section 34 has thus been input to the operating control section 21, the operating control section 21 releases the disk from the clamping mechanism, outputs an operating instruction to the loading motor 11a and outputs an instruction to the roller approach/retraction mechanism to move the loading roller 11b in the direction such as to approach the disk D (step 608), so the disk D is ejected from the insertion aperture 10b while being gripped between the disk guide and the loading roller 11b which is rotating in the disk ejection direction (step 609). When completion of ejection of the disk D is detected by the sensor 11c, the operation control section 21 stops the loading motor 11a.

On the other hand, if for example the authorized user does not return to the computer before lapse of the designated time but a person who is not the authorized user inputs a disk ejection instruction (step 603), the time decision section 38, as described above, determines that the designated time has elapsed without a manual input operation (step 604). If then a password which is not that which was registered beforehand is input in response to the password input screen displayed on the display device 50 (step 605), the decision section 33 decides that these passwords are not in agreement (step 606) and so does not output the ejection instruction of disk D. The loading roller 11b is therefore not operated, so the disk D cannot be taken out and processing is terminated.

Furthermore, if a disk ejection instruction is input before the pre-set time has elapsed, in a condition in which there has been no manual input operation from the input section 40 (step 603), the time decision section 38 determines that the prescribed time length has not elapsed (step 604), and so shifts to the processing of step 607 onwards, permitting the disk D to be taken out.

Figure 7:
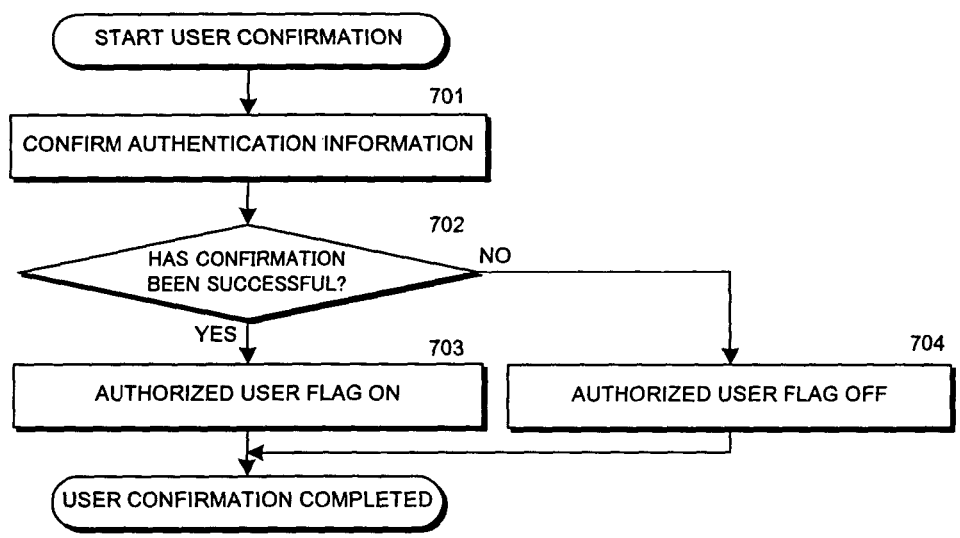
FIG. 7 is a flow chart showing the sequence of user confirmation processing in the embodiment of FIG. 1.

The user confirmation processing shown in FIG. 7 is executed on start-up of the computer and on network login. The pre-setting processing shown in FIG. 5 is performed on registration of the authentication information or on alteration thereof. The user confirmation processing is performed beforehand even when registering the authentication information or altering it. Also, although any desired password can be selected, a password that is easily understood by the user is preferable. Furthermore, in the case of a personal computer for example, consideration may be given to performing operation with the disk ejection processing shown in FIG. 6 incorporated as part of the driver software or OS and this processing may be repeatedly executed from time to time during a short period.

[2-3. Prevention of Theft by Use of a Time Band]

Figure 8:
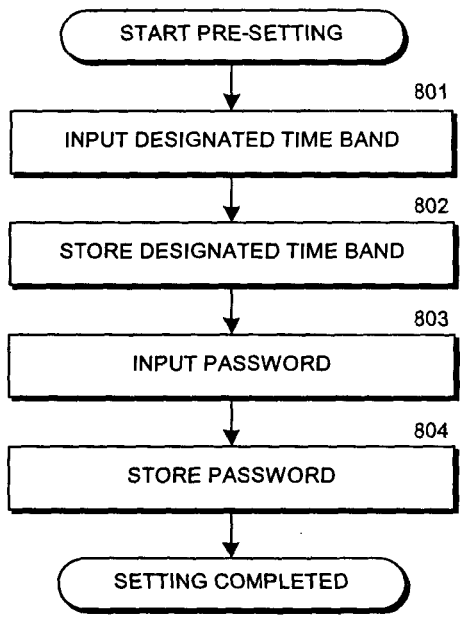
FIG. 8 is a flow chart showing the sequence of time band registration processing in the embodiment of FIG. 1.
Figure 9:
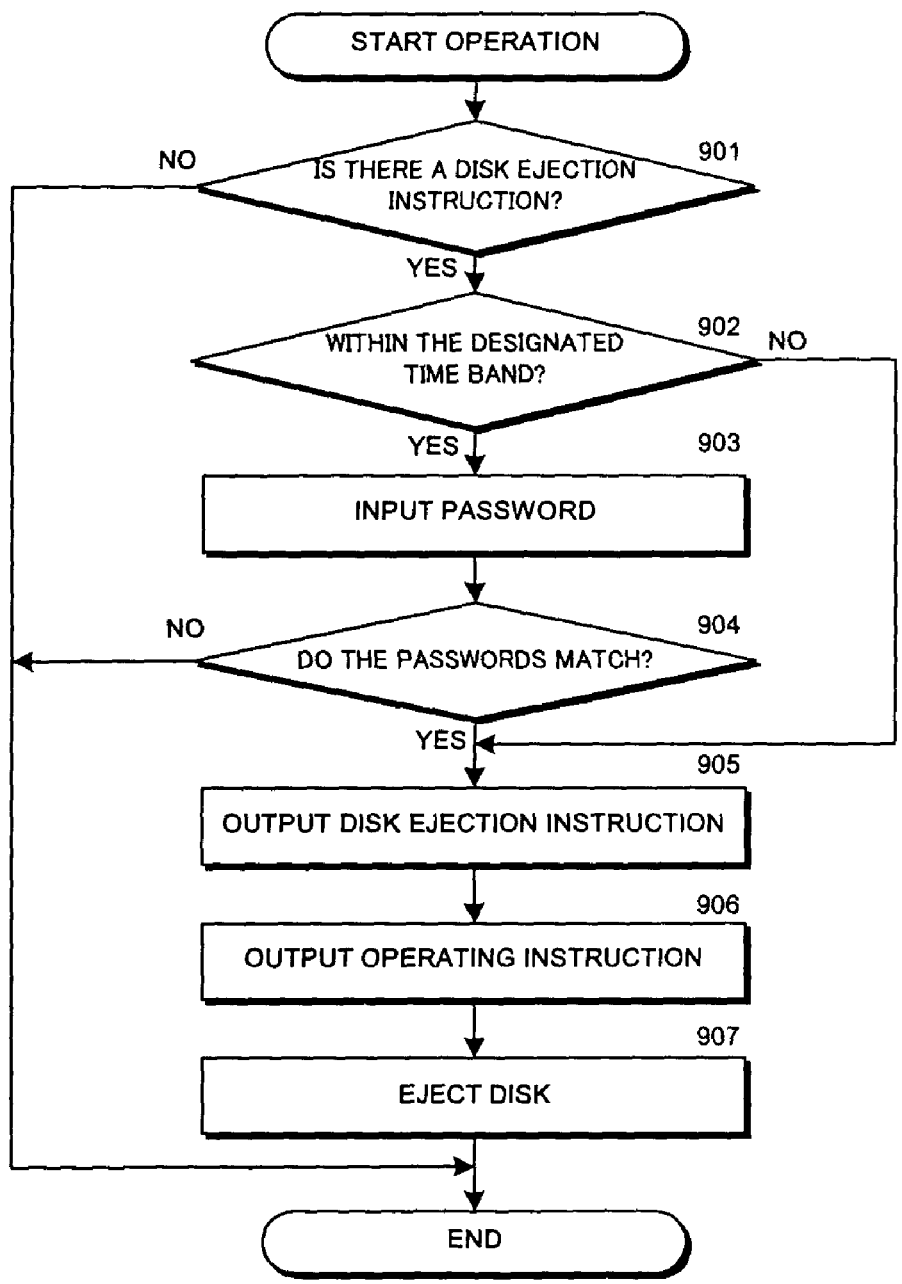
FIG. 9 is a flow chart showing the sequence of disk theft prevention processing of a time band designation in the embodiment of FIG. 1.
Figure 10:
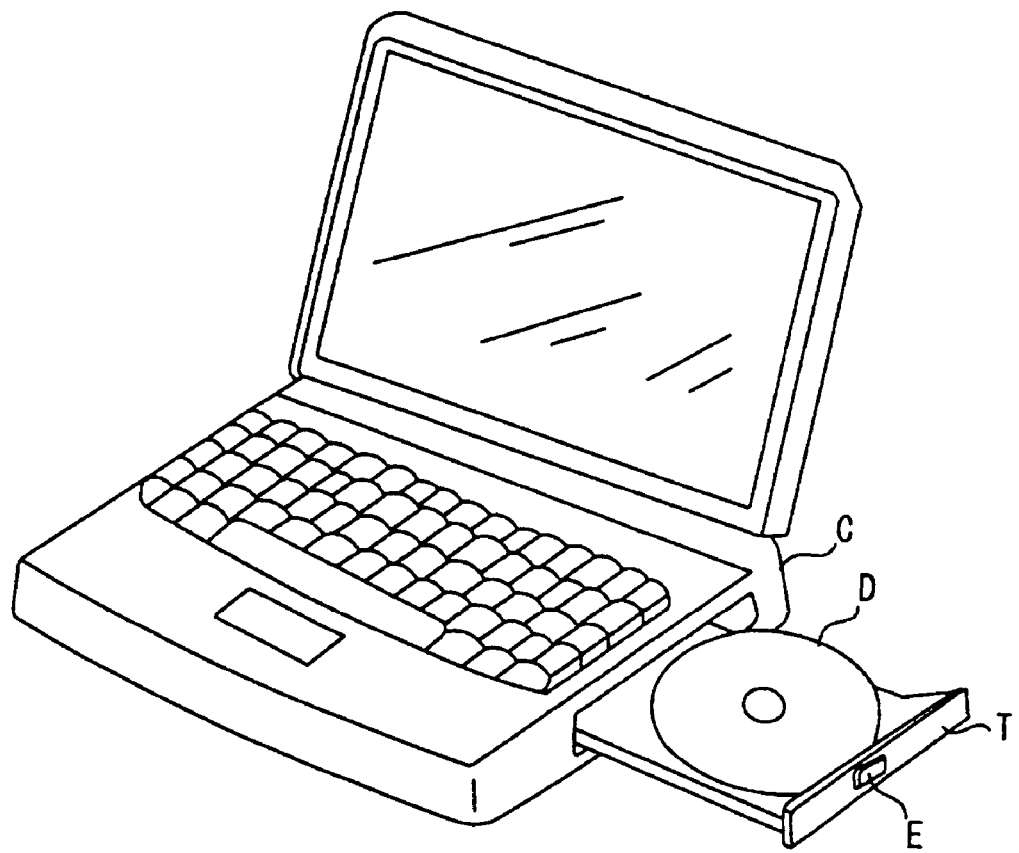
FIG. 10 is a perspective view showing an example of a personal computer incorporating a disk drive device of the tray type.

Next, the procedures for restricting disk ejection to a time band designated beforehand will be described with reference to the flow chart of FIG. 8 and FIG. 9. Description of steps which are the same as steps shown in FIGS. 5 to 7 above is omitted to simplify the description. Specifically, an authorized user who wishes to set disk theft prevention inputs a designated time band (for example from 6 am to 6 pm) from an input section 40 in response to an input screen (step 801). When this has been done, this designated time band is stored in a memory section 32 by a time setting section 36 in the authentication control section 30 (step 802). Next, the authorized user performs the procedure for setting the password in the same way as described above (steps 803, 804).

If, after setting has thus been performed, and authorized user wishes to take out a disk D in the designated time band (for example 6 am to 6 pm), a disk ejection instruction is input from the input section 40 (step 901). When this is done, using the time measured by the timer 37 and the time band stored in the memory 32, the time decision section 38 determines that this is within the designated time band (in this case, 6 am to 6 pm) (step 902).

Next, when the registered password is input from the input section 40 in response to display of the password input screen on the display device 50 (step 903), as described above, if it is found that the passwords are in agreement (step 904), a disk ejection instruction is output to the operation control section 21 (step 905), so the disk D is ejected (steps 906, 907).

On the other hand, if, during the designated time band, a person who is not the authorized user inputs a disk ejection instruction (step 901), as described above, the time decision section 38 determines that this is within the designated time band (step 902). If then, in response to the password input screen that is displayed on the display device 50, a password is input which is not that which was previously registered (step 903), the decision section 33 determines that the passwords do not agree (step 904) and so a disk D ejection instruction is not output and the disk D cannot be taken out.

It should be noted that if a disk ejection instruction is input outside the designated time band of (step 901), the time decision section 38 determines that this is outside the designated time band (step 902) and so shifts to the processing of step 905 and the subsequent steps whereby, whether the person is the authorized user or another person, the disk can be taken out. Just as in the case illustrated by theft prevention using time length as described above, a step of performing user confirmation processing could also be included.

[3. Beneficial Effect of the Embodiment]

The benefits of the embodiment described above are as follows. Specifically, if the set time has elapsed in a condition with no input from the input section 40 and/or within a set time band, the disk D cannot be ejected without inputting the previously registered password, so the disk D cannot be taken out by persons other than the authorized user.

Removal of the disk D by an unauthorized user when the authorized user is absent from the computer or in a time band where the computer is not being used can therefore be effectively prevented. Also, the disk D can be taken out as normal when the computer is in use by the authorized user at the input section 44 or in the time band in which the computer is used, so the convenience of the authorized user is not adversely affected.

Furthermore, since for the drive mechanism section 10 a system is adopted wherein the disk D is fed by a loading roller 11b rather than a tray system, the construction is not one in which the disk D can be forcibly extracted on its own and since the frame 10a itself of the drive mechanism section 10 is accommodated in the computer main unit C in such a way that it cannot be pulled out forcible removal of the disk D by a person other than the authorized user can be reliably prevented.

[4. Other Embodiments]

The present invention is not restricted to the above embodiment. Although, in the above embodiment, the case was described in which the user entered and registered a password capable of being chosen at will and thereafter, when ejection was desired, obtained authentication by inputting this password, it would be possible to arrange for authentication to be obtained by inputting information specific to the disk (for example the file name recorded therein, the holder name, or TOC (table of contents) information, playing time (which could be that of a specified track or the total playing time) or the disk title etc). In such cases, password registration processing by the user may be made unnecessary.

In such cases, a construction could be adopted wherein disk-specific information as described above is automatically read from the disk by default and stored and registered in a memory section and wherein the decision unit determines whether the disk-specific information that is input by the user matches or does not match. Also, a construction could be adopted whereby, on insertion of a disk, specific information selected by the user from a plurality of items of specific information displayed on the screen is stored and registered in the memory section and employed for authentication. By thus employing disk-specific information, the user can more easily remember the authentication information than by using a password and registration of the authentication information is facilitated.

Also, although, in the above embodiment, it was arranged that disk ejection was restricted within a specified time band, it would be possible for disk ejection to be arranged to be restricted outside a specified time band. Also, the specified time length and time band need not be as illustrated by way of example in the embodiment but could be other time length and time band.

Also, the input means for inputting the authentication information is not restricted to a keyboard or mouse. For example, when applying the present invention to a game device or audio/video device wherein a disk is employed as the recording medium, a construction could be adopted in which the authentication information is input from input means such as the buttons of a game pad, a joystick, the operating buttons of an escutcheon or a remote controller.

In such cases, it could be arranged to input a password by selecting letters, numerals, symbols or the like from a table displayed on the screen but it would for example also be possible to arrange to employ a combination of the sequence or number of times of pressing a plurality of buttons as the authentication information. By adopting such an arrangement, setting and input of the authentication information by the operation of buttons can easily be performed.

Also, the password is not restricted to being a so-called code number but could be any of letters, symbols or numbers or a combination of these. Also, the type of authentication information is not restricted to passwords. For example, as the input means connected to the authentication control means, it would be possible for an identification device to be provided whereby the voice, fingerprint or retinal pattern is detected and converted to a signal suitable for comparison and the authorized user to be identified by using the signal from this identification device.

More specifically, if a voice identification device is connected to the I/F 35 in the above embodiment, authentication of a so-called specified speaker (speaker restriction) can be performed. First of all, when the voice of the authorized user is input from the voice identification device, the voice signal is stored in the memory section 32 by the registration and management section 31. Next, when there is a voice signal input through the voice identification device from the authorized user who inputted the disk ejection instruction, the decision section 33 compares the input voice signal with the voice signal of the authorized user stored in the memory 32 and, if these match, outputs a disk ejection instruction from the ejection instruction section 34. If they do not match, the disk ejection instruction is not output. The same applies when a fingerprint identification device or retinal pattern identification device is connected. It should be noted that, in the case of voice, identification accuracy can be increased by restricting the phrases that can be employed to an arbitrary phrase or a pre-set phrase.

In addition, the above various types of authentication information could be employed in combination. For example, by storing a password and a voice signal in the memory section, a construction could be adopted in which disk ejection processing is performed if both this password and the voice agree with the password that was input from the keyboard and the voice signal from the voice identification device. Also, a construction could be adopted in which disk ejection processing is performed if either of the registered password and voice agree with the input authentication information. Such a combination may comprise any of a password, button operation, voice, fingerprint, or retinal pattern or other types of authentication information.

Also, the theft prevention effect can be further raised by forming the frame 10a of the drive mechanism section 10 integrally with the computer main unit C. Also, the position of the insertion port 10b could be any position on the computer main unit C.

Also, the disk loading mechanism employing the loading roller is not restricted to that of the embodiment described above. For example, all well-known techniques such as that illustrated in Japanese Utility-Model Publication Number H. 5-1003 or Japanese Patent Publication Number H. 6-103568 could be employed. Also, the type, position and number of sensors used to detect insertion/ejection or the like of the disk can be freely designed and a construction aimed at preventing insertion of foreign bodies or identification of the disk diameter could be adopted by employing a plurality of sensors as in the technology illustrated in Japanese Patent Publication Number H. 6-103568. Furthermore, a disk ejection mechanism not employing a loading roller could be used.

Also, for the clamping mechanism, a construction could be adopted whereby the disk is pressed against a clamper arranged in the ceiling of the drive mechanism by raising of the turntable side. A construction could be adopted wherein a link mechanism is provided whereby the disk release and pressing-on that are executed by the clamping mechanism and the disk pressing-on and release by the loading roller, performed by the roller approach/retraction mechanism, are conducted in a linked fashion.

Furthermore, the disk drive device to which the present invention is applied is not restricted to a device for a personal computer of the desktop or notebook type. For example, as described above, it could be employed as a drive device for recording media of games machines or a drive device for recording media of audio/video devices. Consequently, the display device also could be a television receiver or a display device using LEDs or the like. Also, the recording media could be of any shape, type or size, and could be for recording/reproduction or solely for reproduction (signal read only).

INDUSTRIAL APPLICABILITY

As described above, with the present invention, a disk drive device can be provided wherein removal of the disk by persons other than the authorized user can be reliably prevented.

The invention claimed is:

1. A disk drive device in which a signal detection section that detects a disk signal and a disk ejection mechanism that ejects a disk are connected to a control device having input means, characterized in that said control device comprises:

mechanism control means that controls drive of said disk ejection mechanism; and authentication control means that, in a condition in which there has been no manual input operation from said input means, and a pre-set time length has elapsed, outputs a disk ejection instruction to said mechanism control means only if a disk ejection instruction and the authentication information are input;

said authentication control means comprises an authentication information storage section that stores prescribed authentication information;

said authentication information is disk-specific information that is detected by said signal detection section and stored in said authentication information storage section;

said disk-specific information is selected from one or more of the disk title, file name, holder name, table of contents information and playing time;

and including a display screen for displaying disk-specific information when a disk is inserted into the disk drive device and a user is enabled to select, only from the disk-specific information, the authentication information to be stored by said input means in the authentication information storage section from the selected disk-specific information.

2. The disk drive device according to claim 1, characterized in that authentication information input means that inputs authentication information is connected to said authentication control means and said authentication control means comprises:

a time measurement section that measures time;

a set time storage section that stores a pre-set time length;

a time decision section that determines whether or not the pre-set time length has elapsed, in accordance with information from said time measurement section and said set time storage section;

an authentication information storage section that stores prescribed authentication information;

a decision section that decides whether or not the authentication information that was input from said authentication information input means agrees with the authentication information stored in said authentication information storage section; and a disk ejection instruction section that outputs a disk ejection instruction to said mechanism control means only if said time decision section determines that the pre-set time length has elapsed and a disk ejection instruction is input and the authentication information is determined to be in agreement by said decision section.

3. The drive device according to claim 1, characterized in that said authentication information is supplemented with a separate password.

4. The disk drive device according to claim 2, characterized in that said authentication information input means comprises a plurality of switches operated by a plurality of buttons; and said authentication information includes information relating to a combination of sequence and number of times of switch changeover in accordance with operation of said plurality of buttons.

5. The disk drive device according to claim 2, characterized in that said authentication information input means comprises a voice identification section; and said authentication information includes speaker-limiting voice information.

6. The disk drive device according to claim 2, characterized in that said authentication information input means comprises a fingerprint identification section; and said authentication information includes fingerprint information.

7. The disk drive device according to claim 2, characterized in that said authentication information input means comprises a retinal pattern detection section; and said authentication information includes retinal pattern information.

8. The disk drive device according to claim 2, characterized in that the authentication information used in the determination by said decision section is at least two of a plurality of types of authentication information or is one or other of at least two types of the plurality of types of authentication information.

9. The disk drive device according to claim 1, characterized in that the authentication information used in the determination by said decision section is at least two of a plurality of types of authentication information or is one or other of at least two types of the plurality of types of authentication information.

10. The disk drive device according to claim 3, characterized in that the authentication information used in the determination by said decision section is at least two of a plurality of types of authentication information or is one or other of at least two types of the plurality of types of authentication information.

11. The disk drive device according to claim 4, characterized in that the authentication information used in the determination by said decision section is at least two of a plurality of types of authentication information or is one or other of at least two types of the plurality of types of authentication information.

12. The disk drive device according to claim 5, characterized in that the authentication information used in the determination by said decision section is at least two of a plurality of types of authentication information or is one or other of at least two types of the plurality of types of authentication information.

13. The disk drive device according to claim 6, characterized in that the authentication information used in the determination by said decision section is at least two of a plurality of types of authentication information or is one or other of at least two types of the plurality of types of authentication information.

14. The disk drive device according to claim 7, characterized in that the authentication information used in the determination by said decision section is at least two of a plurality of types of authentication information or is one or other of at least two types of the plurality of types of authentication information.

* * * * *